(12) United States Patent
Yun (10) Patent No.: US 7,405,428 B2
(45) Date of Patent: Jul. 29, 2008

(54) TRANSFLECTIVE LIQUID CRYSTAL DISPLAY PANEL AND MANUFACTURING METHOD THEREOF

(75) Inventor: Young-Nam Yun, Gunpo-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 196 days.

(21) Appl. No.: 11/376,935

(22) Filed: Mar. 16, 2006

(65) Prior Publication Data

US 2006/0208275 A1    Sep. 21, 2006

(30) Foreign Application Priority Data

Mar. 18, 2005    (KR)    .................... 10-2005-0022751

(51) Int. Cl.
H01L 29/04    (2006.01)
H01L 31/20    (2006.01)
H01L 31/036    (2006.01)
H01L 31/0376    (2006.01)

(52) U.S. Cl. .......................................... 257/72; 257/59

(58) Field of Classification Search .................. 257/72, 257/59, E21.414, E21.578
See application file for complete search history.

(56) References Cited

U.S. PATENT DOCUMENTS 7,279,730 B2 * 10/2007 Pak et al. ..................... 257/291
7,317,208 B2 * 1/2008 You ............................. 257/72

FOREIGN PATENT DOCUMENTS

| JP | 11-316382 | 11/1999 |
|----|-----------|---------|
| JP | 2003-131246 | 5/2003 |
| JP | 2003-167237 | 6/2003 |
| JP | 2003-207775 | 7/2003 |
| JP | 2003-222854 | 8/2003 |
| JP | 2004-038186 | 2/2004 |
| KR | 2001-0054411 | 7/2001 |
| KR | 2001-0087658 | 9/2001 |
| KR | 2004-0049540 | 6/2004 |
| KR | 2004-0059088 | 7/2004 |
| KR | 2004-0071856 | 8/2004 |

* cited by examiner

*Primary Examiner*—Cuong Q Nguyen
(74) *Attorney, Agent, or Firm*—F. Chau & Associates, LLC (57) ABSTRACT

A transistor array panel comprises a substrate, a transparent electrode disposed on the substrate, a gate line disposed on the substrate, a gate insulating layer disposed on the transparent electrode and the gate line, a semiconductor layer disposed on the gate insulating layer, a data line and a drain electrode disposed on the semiconductor layer, a first insulating layer having an uneven surface, the first insulating layer disposed on the data line and the drain electrode, and a reflective electrode disposed on the first insulating layer, the reflective electrode connected to the transparent electrode and the drain electrode, wherein at least a portion of the transparent electrode is exposed.

14 Claims, 12 Drawing Sheets

TRANSFLECTIVE LIQUID CRYSTAL DISPLAY PANEL AND MANUFACTURING METHOD THEREOF

CROSS-REFERENCE TO RELATED PATENT APPLICATION

This application claims priority to Korean Patent Application No. 10-2005-0022751, filed on Mar. 18, 2005, the disclosure of which is incorporated by reference herein in its entirety.

BACKGROUND OF THE INVENTION (a) Technical Field

The present disclosure relates to a transflective liquid crystal display, and more particularly, to a transflective liquid crystal display including a transistor array panel and a manufacturing method thereof.

(b) Discussion of the Related Art

A liquid crystal display (LCD) includes a panel assembly including, for example, a transistor array panel, a color filter panel, and a liquid crystal layer interposed therebetween. Since the LCD is a non-emissive device, a backlight unit for supplying light is provided behind the panel assembly. The transmittance of light emitted from the backlight unit is determined according to an alignment state of liquid crystal molecules in the liquid crystal layer.

Types of LCDs include a transmissive LCD for displaying an image by using an internal light source such as, for example, a backlight unit, a reflective LCD for displaying an image by using external light such as, for example, natural light, and a transflective LCD. The transflective LCD includes a transmissive display mode and a reflective display mode. The transmissive display mode, where an image is displayed by using an internal light source, can be used where external light is limited such as, for example, indoors or in a dark place. The reflective display mode, where an image is displayed by reflecting external light, can be used where the external light is sufficiently provided such as, for example, outdoors or in a bright place.

The transmissive LCD includes a backlight unit provided behind the panel assembly, and light emitted from the backlight unit passes through the panel assembly. The transmissive LCD consumes more power and is heavier and thicker compared to the reflective LCD.

The reflective LCD consumes less power compared to the transmissive LCD because the backlight unit is not used. However, the reflective LCD using external light may not display an image properly when external light is not sufficiently provided.

The transflective LCD can have sufficient luminance irrespective of ambient brightness because internal and/or external light can be used.

A conventional transistor array panel of the transflective LCD is usually manufactured by using about seven or eight masks. Masks are used for, for example, forming a gate electrode, a semiconductor layer, a source/drain electrode, a contact hole on a protective film, a contact hole in an organic insulating layer, a transparent electrode, and a reflective electrode.

The transflective LCD may employ a dual cell gap structure between a reflective region and a transmissive region of a pixel portion to reduce non-uniform luminance caused by, for example, a path difference of light. However, due to a step difference of an organic film for forming the dual cell gap structure, a transparent electrode and a reflective electrode can be disconnected in the transmissive region. Further, an etching process for forming the reflective electrode can damage the transparent electrode. In addition, when the transparent electrode is formed at a step difference, an etchant for the reflective electrode can flow along the step difference to the transparent electrode. In such a case, the transparent electrode may be eroded.

SUMMARY OF THE INVENTION

The transistor array panel according to embodiments of the present invention includes a pixel portion and a pad portion. The pixel portion applies an electric field to liquid crystal molecules, and the pad portion applies an external input voltage to the pixel portion.

The pixel portion may include a gate electrode having a function of a switch of a thin film transistor, an auxiliary capacitor electrode for sustaining an applied voltage during one frame, a gate insulating layer disposed on the gate electrode and the auxiliary capacitor electrode, a semiconductor layer in which a channel is formed, an $n^+$ amorphous silicon layer, a data line supplied with image information signals, a source electrode, a drain electrode, a protective film (passivation film) disposed on the source and drain electrodes and preventing a short-circuit to an external electrode, and an uneven organic layer disposed on the protective film.

The pixel portion may include a reflective region and a transmissive region. The reflective region may include a reflective pixel electrode that reflects external light and may be disposed on the uneven organic layer. The transmissive region may include a transparent pixel electrode that transmits light emitted from a light source unit provided to a rear surface of a liquid crystal panel assembly. The transparent pixel electrode may be disposed on the same layer as the gate electrode and the auxiliary capacitor electrode.

According to an embodiment of the present invention, the reflective pixel electrode and the transparent pixel electrode may contact each other near the transmissive region.

The transparent pixel electrode may comprise indium tin oxide (ITO) or indium zinc oxide (IZO). The gate electrode may comprise at least one metal of chromium (Cr), an aluminum alloy (e.g., AlNd), and molybdenum (Mo). For example, the gate electrode may have a single-layered structure of chromium, a multi-layered structure of chromium and aluminum, or a multi-layered structure of molybdenum and aluminum.

The source electrode and the drain electrode may comprise at least one metal of chromium, an aluminum alloy (e.g., AlNd), and molybdenum (Mo). For example, the source electrode and the drain electrode may have a multi-layered structure of chromium and aluminum or molybdenum, aluminum, and molybdenum.

The pad portion may include a gate pad portion including a gate fan-out portion connected to gate lines and receiving control signals from an external device, and a data pad portion including a data fan-out portion connected to the data lines and receiving image signals from an external device.

According to an embodiment of the present invention, the gate pad portion and the data pad portion may include transparent pad electrodes disposed on an upper surface of a substrate. The transparent pad electrodes may be formed from the same layer as the gate electrode and may be patterned simultaneously with the transparent pixel electrode in the transmissive region.

In the gate pad portion according to an embodiment of the present invention, the transparent pad electrode may contact the gate fan-out portion. On the transparent pad electrode and the gate fan-out portion, an insulating layer, a protective film, and an organic layer having an uneven upper surface can be formed. On the organic layer, a reflective pad electrode which contacts the transparent pad electrode and the gate fan-out portion can be formed.

In the data pad portion according to an embodiment of the present invention, a gate insulating layer, a data fan-out portion, and an organic layer having an uneven upper surface can be formed on the transparent pad electrode. On the organic layer, a reflective pad electrode which contacts the transparent pad electrode and the gate fan-out portion can be formed.

A buffer layer may be formed between the reflective pad electrode and the transparent pad electrode in each of the data pad portion and the gate pad portion. The buffer layer may comprise an insulating layer or a metal layer. The buffer layer can prevent corrosion caused by electron affinity of the transparent pad electrode and the reflective pad electrode.

In the gate pad portion according to another embodiment of the present invention, a gate fan-out portion, a gate insulating layer formed on the gate fan-out portion, a protective film, an organic layer formed on the protective film and having an uneven upper surface, and a reflective pad electrode formed on the organic layer can be formed. The gate fan-out portion can be formed in the same layer as the gate electrode and patterned together with the gate electrode. The organic layer may have an uneven upper surface, and the reflective pad electrode may contact the gate fan-out portion.

In the data pad portion according to an embodiment of the present inversion, a data fan-out portion formed on a gate insulating layer, a protective film, an organic layer having an uneven upper surface, and a reflective pad electrode which is formed on the organic layer and contacts the data fan-out portion can be formed.

According to an embodiment of the present invention, a transparent pixel electrode of a transmissive region in a pixel portion can be formed on a substrate which includes a pixel portion and a pad portion, and then a gate pad, a gate electrode, and an auxiliary capacitor electrode are formed on the substrate. Next, a thin film transistor (TFT) including a source electrode, a drain electrode, and a semiconductor layer can be formed. Then, in the pixel portion of the substrate, an organic layer having an uneven upper surface and having contact holes exposing the drain electrode of the TFT and contact holes for the transparent pixel electrode transmissive region can be formed. Next, a reflective pixel electrode in the pixel portion and a reflective pad electrode in the pad portion of the substrate can be formed. The reflective pixel electrode and the reflective pad electrode can be separated from each other near a boundary between the pixel portion and the pad portion. A transflective electrode for reflecting light illuminated from the upper portion of the organic layer pattern and transmitting light illuminated from the lower portion of the organic layer pattern can be formed, thereby completing the transflective liquid crystal display.

According an embodiment of the present invention, a first photolithography step can used to form a transparent pixel electrode in a transmissive region of a pixel portion on the substrate. The transparent pixel electrode may comprise indium tin oxide (ITO) or indium zinc oxide (IZO). Next, a gate metal layer can be deposited on the substrate and patterned by using a second photolithography step.

The gate electrode may comprise at least one metal of chromium, an aluminum alloy, and molybdenum. For example, the gate electrode may comprise a single-layered structure of chromium, a multi-layered structure of chromium/aluminum, or a multi-layered structure of molybdenum/aluminum.

Next, the gate insulating layer can be deposited, and then a third photolithography step can be used to sequentially form a semiconductor member including a channel portion, a source electrode, and a drain electrode, which form a thin film transistor.

The semiconductor member may have a double-layered structure of an amorphous silicon film and an $n^+$ amorphous silicon film.

The source electrode and the drain electrode may comprise at least one metal of chromium, an aluminum alloy (e.g., AlNd), and molybdenum. For example, the source electrode and the drain electrode may comprise a multi-layered structure of chromium-aluminum or molybdenum-aluminum-molybdenum.

After a semiconductor layer and a metal layer for the source electrode and the drain electrode are deposited in sequence, a photoresist can be applied on the metal layer. A photoresist may be a positive photoresist of which an exposed portion is removed by a developing process, and a negative photoresist of which exposed portion is not removed by the developing process.

After the photoresist is applied, an amount of exposure light illuminated on the photoresist can be adjusted by using a slit mask or a transflective mask to form a photoresist pattern on the metal layer. The photoresist pattern may include a first portion where a semiconductor member, the source electrode, and the drain electrode are to be formed and a second portion having a thickness smaller than that of the first portion.

Next, the semiconductor member, the source electrode, and the drain electrode can be formed using the photoresist pattern as an etch mask. Then, an etch-back process can be performed on the photoresist pattern to remain only the first portion of the photoresist pattern. After that, a channel portion can be formed.

A protective film and an organic layer can be sequentially deposited on the substrate where the thin film transistor is formed. The organic layer may be directly deposited on the source electrode and the drain electrode without the protective film.

When the organic layer directly contacts the channel portion, the OFF characteristic of a thin film transistor may deteriorate due to dangling bonds of amorphous silicon. The problem can be solved by a bake process. In addition, since a production process for a liquid crystal display is performed with thermal energy corresponding to a temperature of about 200 degrees or more, the thin film transistor can be naturally stabilized, so that the protective film can be omitted.

Next, a fourth mask etching process can be performed to form the organic insulating layer having an uneven upper surface, a contact hole exposing the drain electrode of the thin film transistor and a contact hole for the transparent pixel electrode of the transmissive region. In the fourth mask process, a photosensitive film can be coated and patterned by adjusting an amount of exposure light through a slit mask or a translucent mask, so that both the uneven upper surface and the contact holes can be formed by using one mask.

The uneven upper surface corresponds to a slit portion of a mask and the contact holes exposing the drain electrode and the transparent electrode correspond to openings of the mask. Next, a dry etching process can be performed by using the organic layer as a mask to remove a portion of the gate insulating layer, which remains on the transparent electrode.

Sequentially, a reflective metal layer can be formed on the substrate where the organic layer is formed. A fifth mask etching process can be performed on the reflective metal layer to form a reflective electrode in the reflective region of the pixel portion to reflect external light and to remove portions of the reflective metal layer in the transmissive region of the pixel portion to expose the transparent electrode on the substrate. The fifth mask etching process may form reflective pad electrodes in the gate pad portion and the data pad portion.

The reflective electrode on the pixel portion may contact the transparent electrode and the drain electrode. A buffer layer having a function of preventing corrosion caused by electron affinity may be formed between the reflective layer and the transparent electrode in the transparent region.

According to an embodiment of the present invention, a transistor array panel comprises a substrate, a transparent electrode disposed on the substrate, a gate line disposed on the substrate, a gate insulating layer disposed on the transparent electrode and the gate line, a semiconductor layer disposed on the gate insulating layer, a data line and a drain electrode disposed on the semiconductor layer, a first insulating layer having an uneven surface, the first insulating layer disposed on the data line and the drain electrode, and a reflective electrode disposed on the first insulating layer, the reflective electrode connected to the transparent electrode and the drain electrode, wherein at least a portion of the transparent electrode is exposed.

The transistor array panel may further comprise a second insulating layer disposed between the first insulating layer and the data line.

The first insulating layer may comprise an organic layer, and the second insulating layer may comprise an inorganic layer.

The first insulating layer may comprise a photosensitive film.

The first insulating layer may have an opening exposing both the transparent electrode and the drain electrode, and the reflective electrode may contact the transparent electrode and the drain electrode through the opening.

The transistor array panel may further comprise an auxiliary capacitor electrode formed on the substrate, and the auxiliary capacitor electrode may be separated from the gate electrode, and overlaps the drain electrode.

The transistor array panel may further comprise a gate pad disposed on the substrate, and the gate pad may be formed from the same layer as the transparent electrode, and contacts the gate line.

The transistor array panel may further comprise a contact assistant disposed on the first insulating layer, and the first insulating layer and the gate insulating layer may have a contact hole exposing the gate pad, and the contact assistant may be connected to the gate pad through the contact hole.

The transistor array panel further comprises a data pad disposed on the substrate. The data pad may be formed from the same layer as the transparent electrode, and may contact the data line.

The transistor array panel may further comprise a contact assistant disposed on the first insulating layer.

The first insulating layer and the gate insulating layer may have a contact hole exposing both the data pad and the data line. The contact assistant may be connected to the data line and the data pad through the contact hole.

The transistor array panel may further comprise a contact assistant disposed on the first insulating layer.

The first insulating layer and the gate insulating layer may have a contact hole exposing a portion of the gate line. The contact assistant may be connected to the gate line through the contact hole.

The transistor array panel may further comprise a contact assistant disposed on the first insulating layer.

The first insulating layer and the gate insulating layer may have a contact hole exposing a portion of the data line. The contact assistant may be connected to the data line though the contact hole.

According to an embodiment of the present invention, a method of manufacturing a transistor array panel comprises forming a transparent electrode on a substrate, forming a gate line on the substrate, forming a gate insulating layer, a semiconductor layer, a data line, and a drain electrode on the gate line, forming a first insulating layer having an uneven surface and an opening exposing both the drain electrode and the transparent electrode, and forming a reflective electrode on the first insulating layer, wherein the reflective electrode contacts the drain electrode and the transparent electrode through the opening.

According to an embodiment of the present invention, a liquid crystal display comprises a transistor array panel comprising: a substrate; a transparent electrode disposed on the substrate; a gate line and a data line disposed on the substrate; a thin film transistor connected to the gate line and the data line; a first insulating layer having an uneven surface and disposed on the gate line, the data line, and the thin film transistor; and a reflective electrode disposed on the first insulating layer, wherein the reflective electrode is connected to the transparent electrode and the thin film transistor, and the reflective electrode includes a transmitting window exposing at least a portion of the transparent electrode; a light source providing light to the panel assembly; and a driving circuit unit supplying an electrical signal to the light source and the transistor array panel.

BRIEF DESCRIPTION OF THE DRAWINGS

Exemplary embodiments of the present invention can be understood in more detail from the following descriptions taken in conjunction with the accompanying drawings in which.

DETAILED DESCRIPTION OF EXEMPLARY EMBODIMENTS

Exemplary embodiments of the present invention are more fully described below with reference to the accompanying drawings. The present invention may be embodied in many different forms and should not be construed as limited to the embodiments set forth herein.

Figure 1:
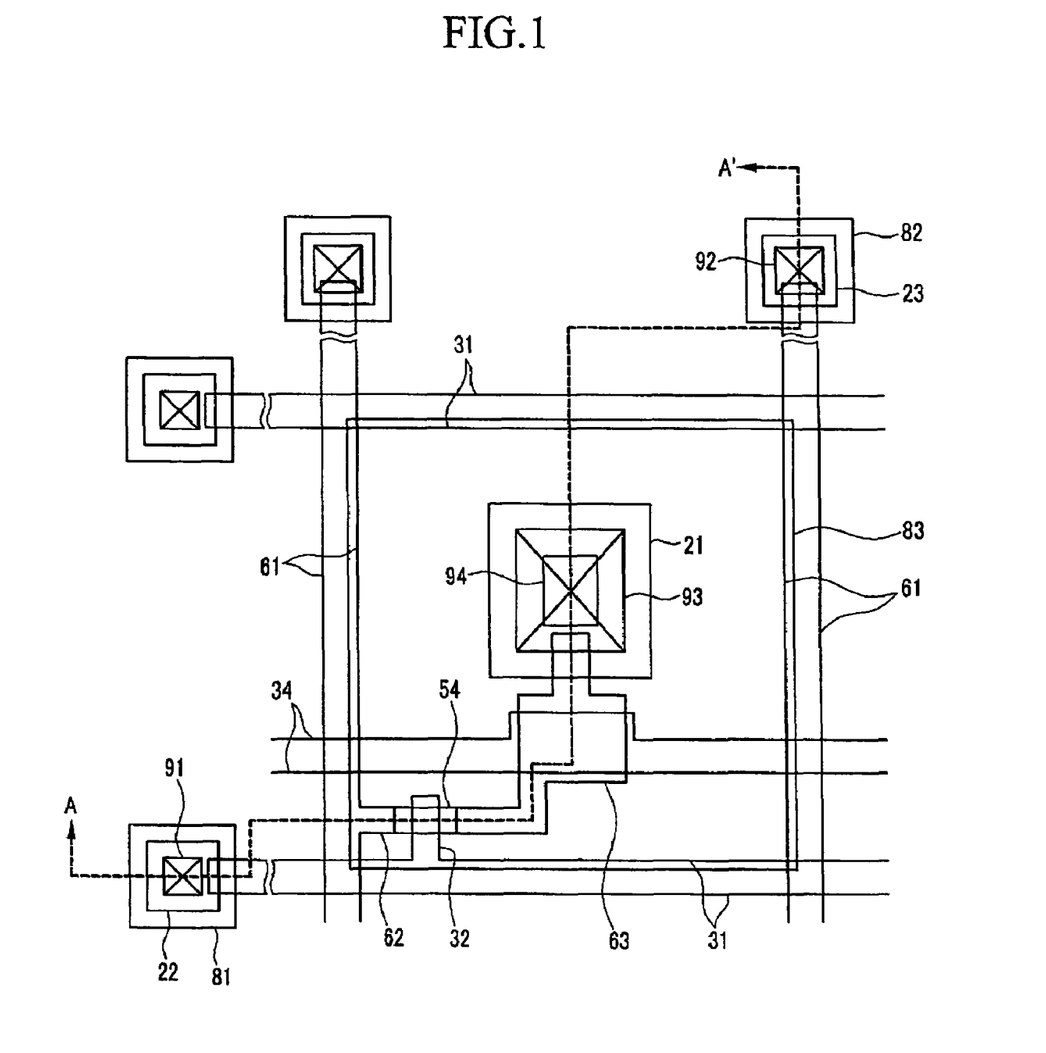
FIG. 1 is a layout view showing a transistor array panel according to an embodiment of the present invention.
Figure 2:
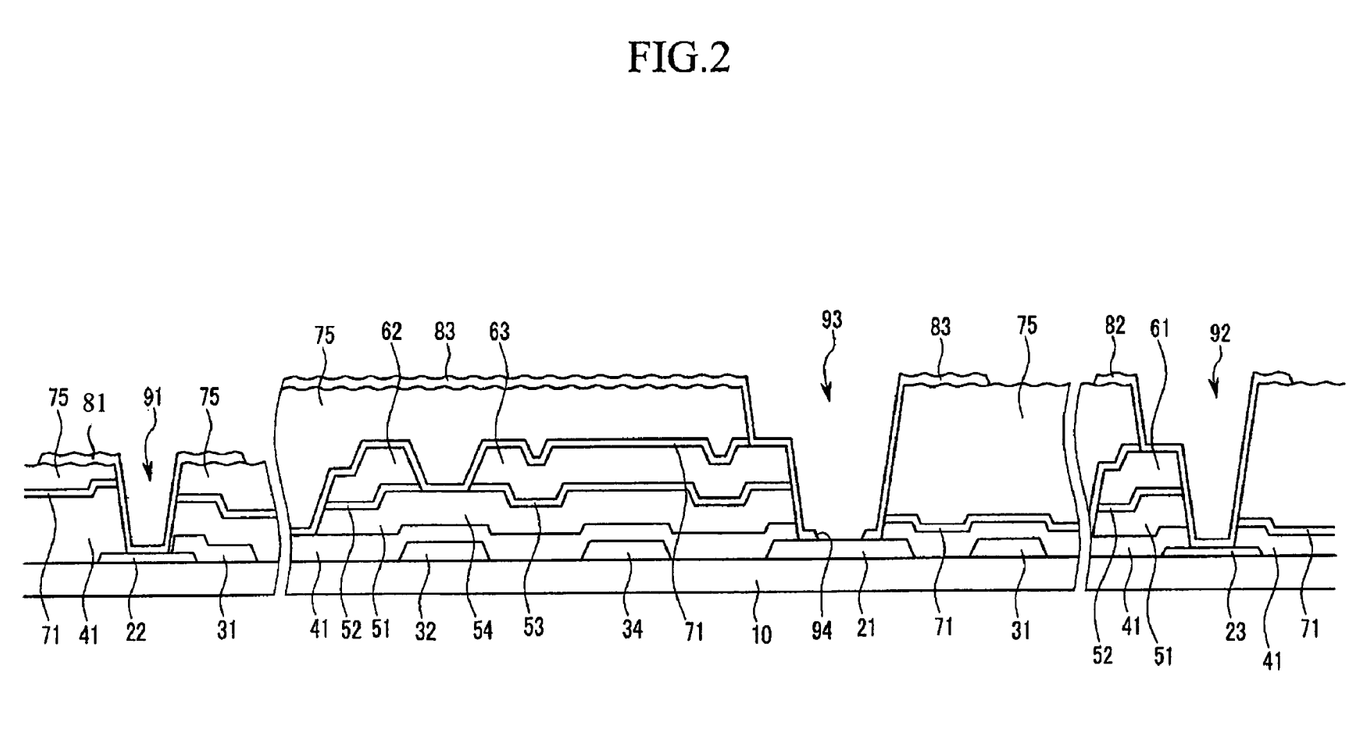
FIG. 2 is a cross-sectional view of the transistor array panel taken along the line A-A' of FIG. 1.

A transistor array panel for a reflective LCD according to an embodiment of the present invention is described with reference to FIGS. 1 and 2. FIG. 1 is a layout view showing a transistor array panel according to an embodiment of the present invention. FIG. 2 is a cross-sectional view of the transistor array panel taken along the line A-A' of FIG. 1.

Referring to FIGS. 1 and 2, a plurality of transparent electrodes 21, a plurality of gate pads 22, a plurality of data pads 23, a plurality of gate lines 31, a plurality of auxiliary capacitor electrode lines 34 are formed on an insulating substrate 10 comprising, for example, transparent glass.

The transparent electrodes 21 have a substantially rectangular shape and are arrayed in a predetermined interval in a central region of the substrate 10. The gate pads 22 and the data pads 23 are disposed in predetermined intervals at the left and upper portions of the substrate 10. The transparent electrodes 21, the gate pads 22, and the data pads 23 comprise a transparent conductive material such as, for example, indium tin oxide (ITO) and indium zinc oxide (IZO). The gate electrodes 32 can be patterned simultaneously with the transparent electrode 21 in the transmissive region.

The gate lines 31 transmit gate signals and extend substantially in a transverse direction. The gate lines 31 are separated from each other. The gate lines 31 include a plurality of gate electrodes 32 protruding upwardly. One end of each gate line 31 is disposed on a gate pad 22 and contacts the gate pad 22.

Each of the auxiliary capacitor electrode lines 34 extends substantially in a transverse direction and is disposed closer to a lower one of two adjacent gate lines 31. Each of the auxiliary capacitor electrode lines 34 includes a plurality of projections protruding upwardly. The auxiliary capacitor electrode lines 34 are supplied with a predetermined voltage such as, for example, a common voltage.

The gate lines 31 and the auxiliary capacitor electrode lines 34 may comprise, for example, an aluminum-based metal such as aluminum (Al) and an aluminum alloy, a silver-based metal such as silver (Ag) and a silver alloy, a copper-based metal such as copper (Cu) and a copper alloy, a molybdenum-based metal such as molybdenum (Mo) and a molybdenum alloy, chromium (Cr), titanium (Ti), or tantalum (Ta).

According to an embodiment of the present invention, the gate lines 31 and the auxiliary capacitor electrode lines 34 may have a multi-layered structure including two conductive layers having different physical properties. One of the two conductive layers may comprise a metal having low resistivity such as, for example, an aluminum-based metal, a silver-based metal, and a copper-based metal to reduce signal delay or voltage drop. The other conductive layer may comprise a material having good physical, chemical, and electrical contact characteristics with other materials such as for example, ITO (indium tin oxide), IZO (indium zinc oxide), a molybdenum-based metal, chromium, titanium, and tantalum. According to an embodiment of the present invention, a combination of a lower Cr or Mo (alloy) layer and an upper Al (alloy) layer can be used. The gate lines 31 and the auxiliary capacitor electrode lines 34 may comprise various metals and conductive materials.

A gate insulating layer 41 comprising, for example, a silicon nitride or a silicon oxide can be formed on the transparent electrodes 21, the gate pads 22, the data pads 23, the gate lines 31, and the auxiliary capacitor electrode lines 34.

A plurality of semiconductor stripes 51 are formed on the gate insulating layer 41. The semiconductor stripes 51 extend substantially in the longitudinal direction. The semiconductor stripes 51 may comprise, for example, a hydrogenated amorphous silicon or polysilicon. The semiconductor stripes 51 include a plurality of protrusions 54 which extend toward the gate electrodes 21, the enlarged portions of the auxiliary capacitor electrode lines 34, and the transparent electrodes 21.

A plurality of line-shaped and island-shaped ohmic contacts 52 and 53 comprising, for example, silicide or an $n^+$ hydrogenated amorphous silicon which is heavily doped with n-type impurities are formed on the semiconductor stripes 51. The line-shaped ohmic contacts 52 include a plurality of the protrusions. Each pair of a protrusion of the line-shaped ohmic contacts 52 and the island-shaped ohmic contacts 53 are disposed on a protrusion 54 of the semiconductor stripes 51.

A plurality of data lines 61 and a plurality of drain electrodes 63 are formed on the ohmic contacts 52 and 53 and the gate insulating layer 41.

The data lines 61 extend substantially in the longitudinal direction to intersect the gate lines 31 and the auxiliary capacitor electrode lines 34. The data lines 61 transmit data voltages. Each of the data lines 61 includes a plurality of source electrodes 62 extending toward the gate electrodes 32 and an end portion overlapping a data pad 23.

Each drain electrode 63 faces a source electrode 62 with respect to a gate electrode 32 interposed therebetween. The drain electrode 63 extends toward an auxiliary capacitor electrode line 34 and a transparent electrode 21 to overlap a protrusion of an auxiliary capacitor electrode line 34 and a transparent electrode 21.

According to an embodiment of the present invention, the data lines 61 and the drain electrodes 63 comprise, for example, a molybdenum-based metal, a refractory metal such as chromium (Cr), titanium (Ti), tantalum (Ta), or an alloy thereof. The data lines 61 and the drain electrodes 63 may have a multi-layered structure of a conductive layer comprising, for example, a refractory metal and a low-resistivity conductive layer. As an example of the multi-layered structure, a double-layered structure of a lower chromium (or molybdenum alloy) layer and an upper aluminum alloy layer and a triple-layered structure of a lower molybdenum alloy layer, an intermediate aluminum alloy layer, and an upper molybdenum alloy layer can be used. According to embodiments of the present invention, various metal and conductive materials may be used.

The ohmic contacts 52 and 53 are interposed between the underlying semiconductors 51 and the overlying data lines 61 and between the underlying semiconductors 51 and the drain electrodes 63. The ohmic contacts 52 and 53 can reduce contact resistance therebetween. The semiconductor stripes 51 have planar shapes that are substantially the same as shapes of the data lines 61 and the drain electrodes 63. According to an embodiment of the present invention, the semiconductor stripes 51 expose portions uncovered by the data lines 61 and the drain electrodes 63, such as, for example, portions disposed between the source electrodes 62 and the drain electrodes 63.

A gate electrode 32, a source electrode 62, a drain electrode 63, and a protrusion 54 of a semiconductor stripe 51 form a thin film transistor (TFT). The channel of the thin film transistor is formed in the protrusion 54 between the source electrode 62 and the drain electrode 63.

A protective film 71 and an organic layer 75 are formed on the data lines 61, the drain electrodes 63, and the gate insulating layer 41. According to an embodiment of the present invention, the protective film 71 comprises an inorganic material such as, for example, a silicon nitride and a silicon oxide, and the organic layer 75 comprises a photosensitive organic material. The height of the surface of the organic layer 75 is uniform, and the surface of the organic layer 75 is uneven. A plurality of contact holes 91 and 92 exposing the gate pads 22 and the data pads 23, respectively, and a plurality of openings 93 exposing the transparent electrodes 21 are formed on the organic layer 75, the protective film 71, and the gate insulating layer 41. Each of the openings 93 further exposes a drain electrode 63, and each of the contact holes 92 further exposes an end portion of a data line 61.

A plurality of reflective electrodes 83 and a plurality of contact assistants 81 and 82 are formed on the organic layer 75.

Reflective electrodes 83 are connected to the drain electrodes 63 and the transparent electrodes 21 through the openings 93, and have a transmitting window 94 exposing the transparent electrodes 21 through the openings 93. The reflective electrodes 83 have an uneven surface corresponding to the uneven surface of the organic layer 75.

Each of contact assistants 81 is connected to the gate pad 22 through the contact hole 91, and each of contact assistants 82 is connected to an end portion of the data line 61 and/or the data pad 23 through the contact hole 92.

The reflective electrodes 83 and the contact assistants 81 and 82 comprise a reflective metal such as, for example, aluminum, an aluminum alloy, silver alloy and silver. The aluminum alloy includes, for example, AlNd. The silver alloy can be, for example, AgPdCu (APC).

In an embodiment, a buffer layer (not shown) may be formed between the pads 22 and 23 and the contact assistants 81 and 82. The buffer layer may comprise, for example, an insulating material or a metal. The buffer layer can prevent corrosion caused by, for example, electron affinity of the pads 22 and 23 and the contact assistants 81 and 82.

According to an embodiment of the present invention, a thin film transistor receives a data voltage supplied from the data line 61 through the contact assistant 82 and the data pad 23. The thin film transistor transmits the data voltages to the reflective electrode 83 and the transparent electrode 21 according to a gate signal supplied from the gate line 31 through the contact assistant 81 and the gate pad 22. The reflective electrode 83 and the transparent electrode 21 together with a common electrode (not shown) in an opposite panel (not shown) generate an electric field. The electric field determines orientations of liquid crystal molecules in a liquid crystal layer (not shown) interposed between the electrodes, so that polarization of light passing through the liquid crystal layer can change.

A first type of light incident on the reflective electrode 83 from the upper side of the substrate 10 through the liquid crystal layer is reflected by the reflective electrode 83 and passes through the liquid crystal layer. A second type of light incident from the lower side of the substrate 10 through the transmitting window 94 passes through the liquid crystal layer. The first type of light can be generated from ambient light of the LCD, and the second type of light can be generated from a light source unit provided to a rear surface or a lower side of the LCD.

The transparent electrode 21, the reflective electrode 83, and the common electrode together with the liquid crystal layer interposed therebetween form a liquid crystal capacitor that sustains the voltage after the thin film transistor turns off. To increase the voltage storage capacity, a storage capacitor is formed in parallel to the liquid crystal capacitor. A storage capacitor can be formed by overlapping an auxiliary capacitor electrode line 34, the electrodes 83 and 21, and a drain electrode 63.

A method of manufacturing the transistor array panel shown in FIGS. 1 and 2 according to an embodiment of the present invention is described with reference to FIGS. 3 to 8.

Figure 3:
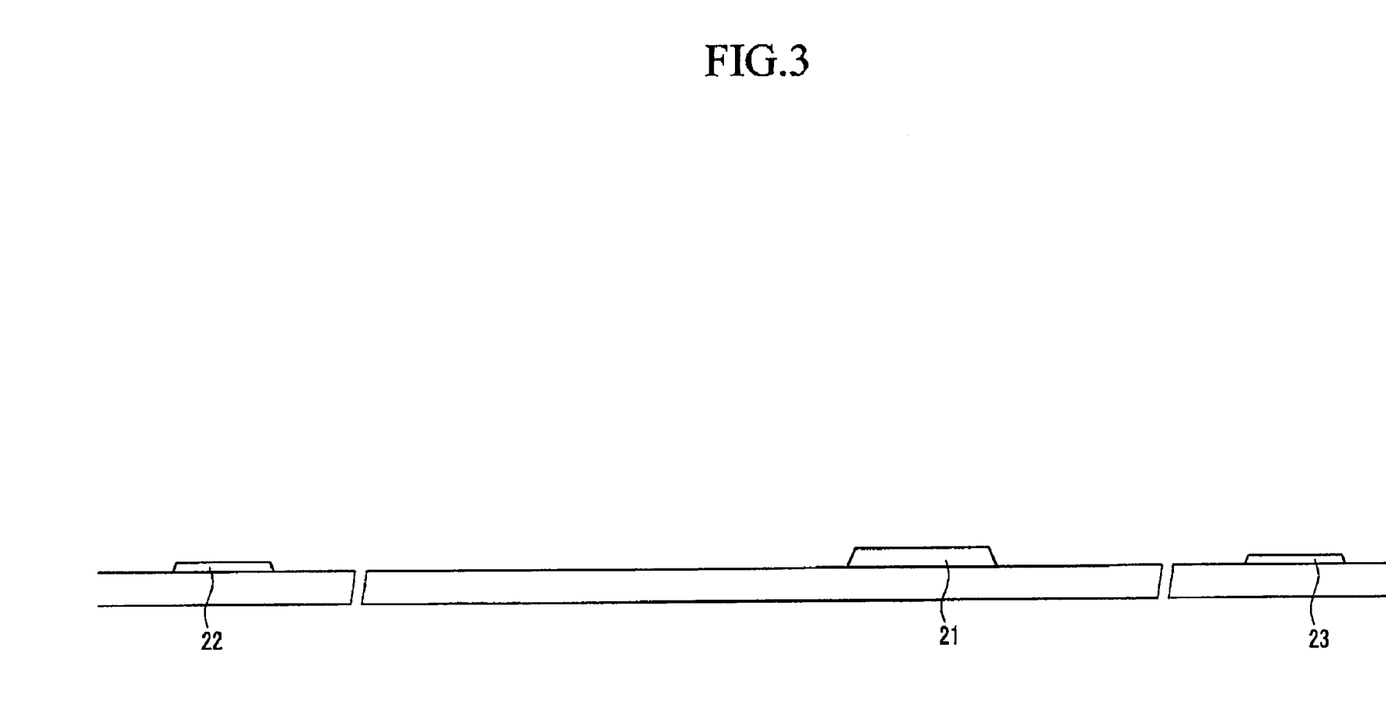
FIGS. 3 to 8 are cross-sectional views of the transistor array panel for showing a method of manufacturing the transistor array panel according to an embodiment of the present invention.
Figure 4:
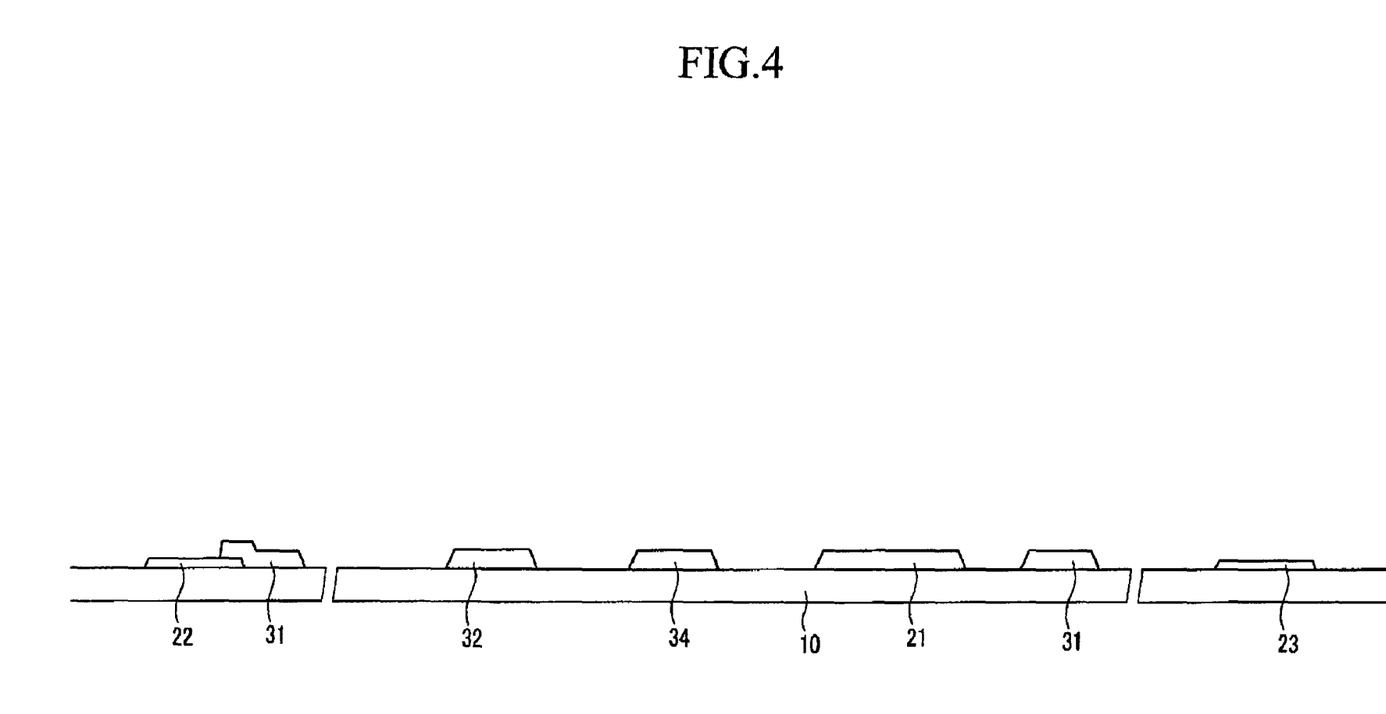

Referring to FIG. 3, the plurality of transparent electrodes 21, the plurality of gate pads 22, and the plurality of data pads 23 are formed on the substrate 10 comprising, for example, glass. Referring to FIG. 4, the plurality of gate lines 31 including the gate electrodes 32 are formed on the substrate 10.

Figure 5:
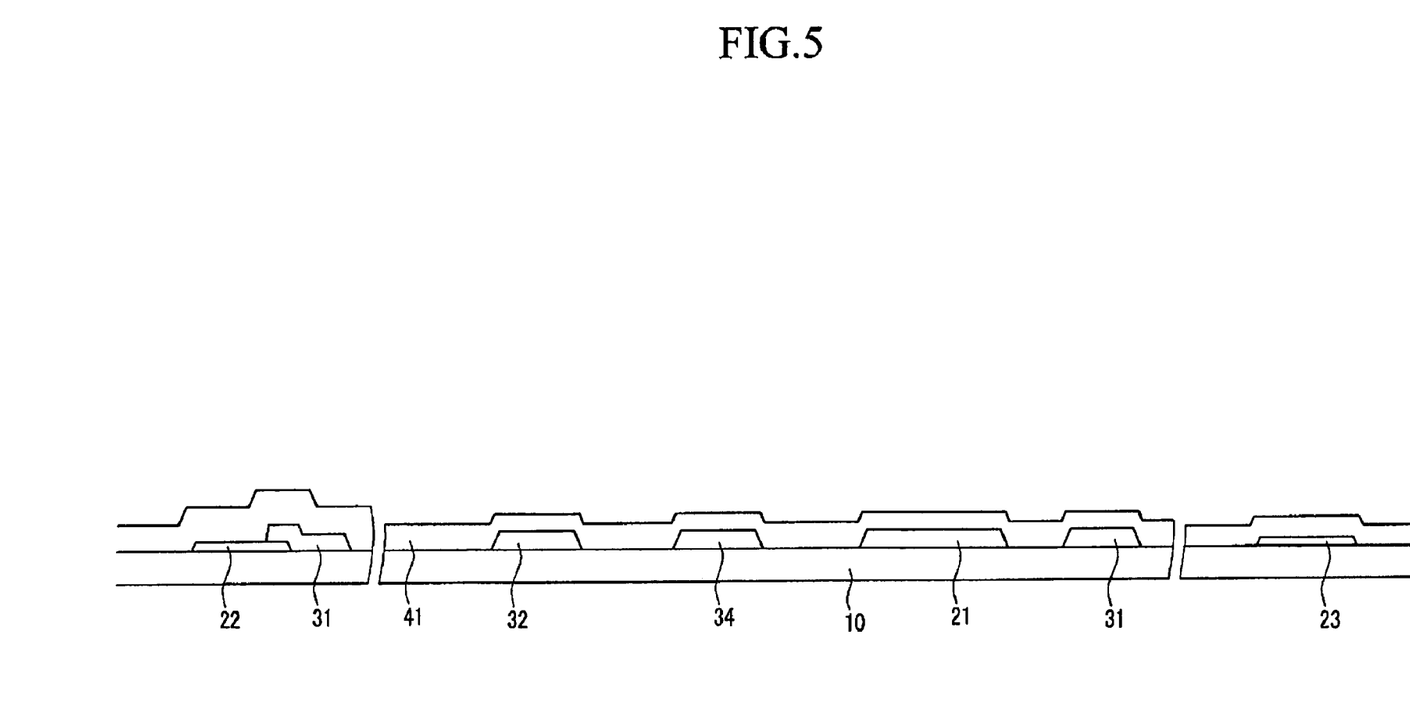

Referring to FIG. 5, the gate insulating layer 41 having a predetermined thickness is formed on the substrate 10, the transparent electrodes 21, and gate lines 31.

Figure 6:
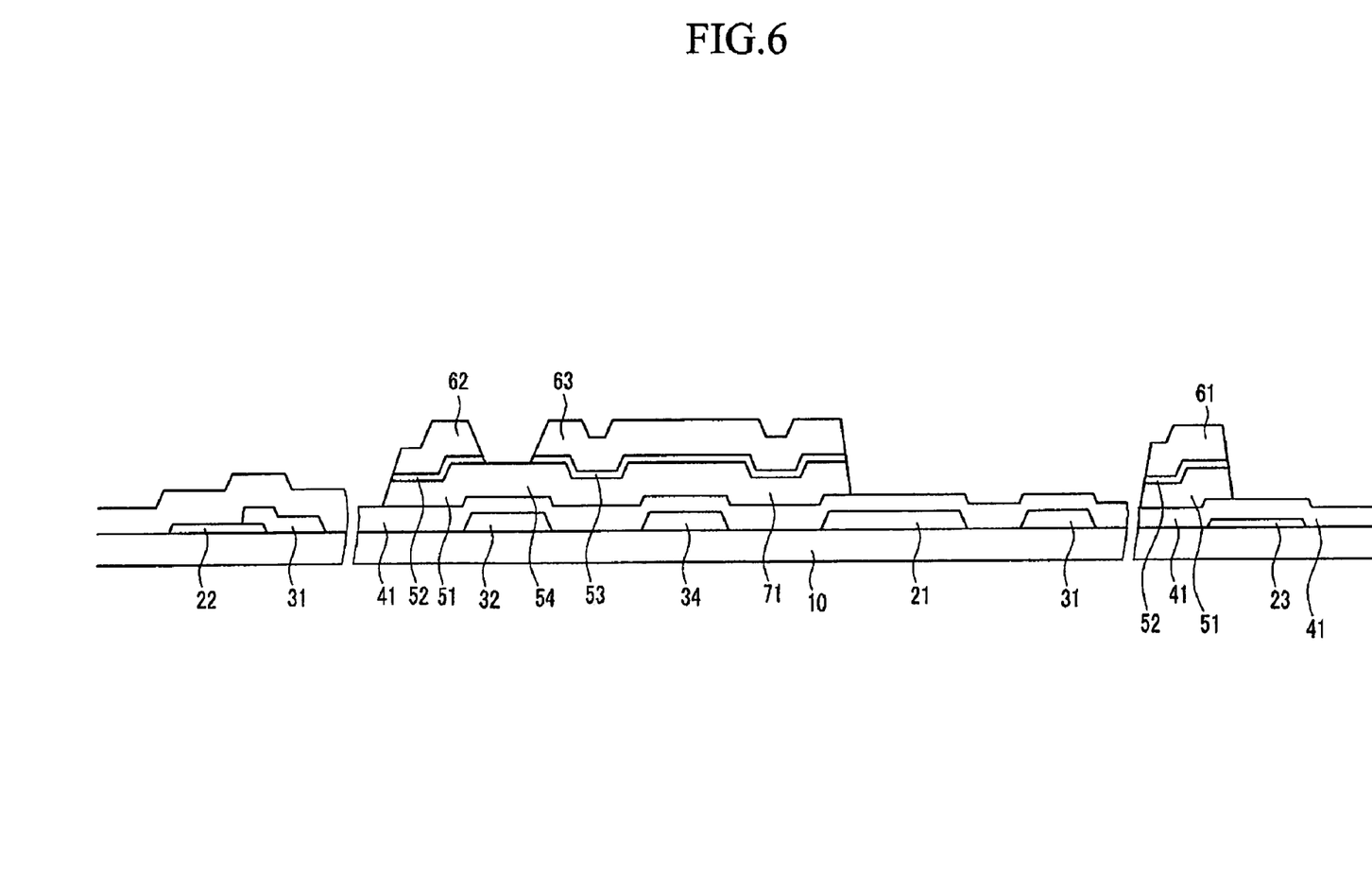

Referring to FIG. 6, an intrinsic amorphous silicon layer, an extrinsic amorphous silicon layer heavily doped with n-type impurity, and a data metal layer are sequentially formed on the gate insulating layer 41.

A mask (not shown) including a light transmitting area, a light blocking area, and a translucent area is used to form a photosensitive film having a position-dependent thickness. The photosensitive film is used to form the plurality of data lines 61 including the source electrodes 62, the plurality of drain electrodes 63, the plurality of ohmic contacts 52 and 53, and the plurality of the semiconductor stripes 51 including protrusions 54. In an embodiment, the mask may be a slit mask or a translucent mask (or two-tone mask). The slit mask has slits in a translucent region, and the translucent mask has a translucent layer in the translucent area.

Figure 7:
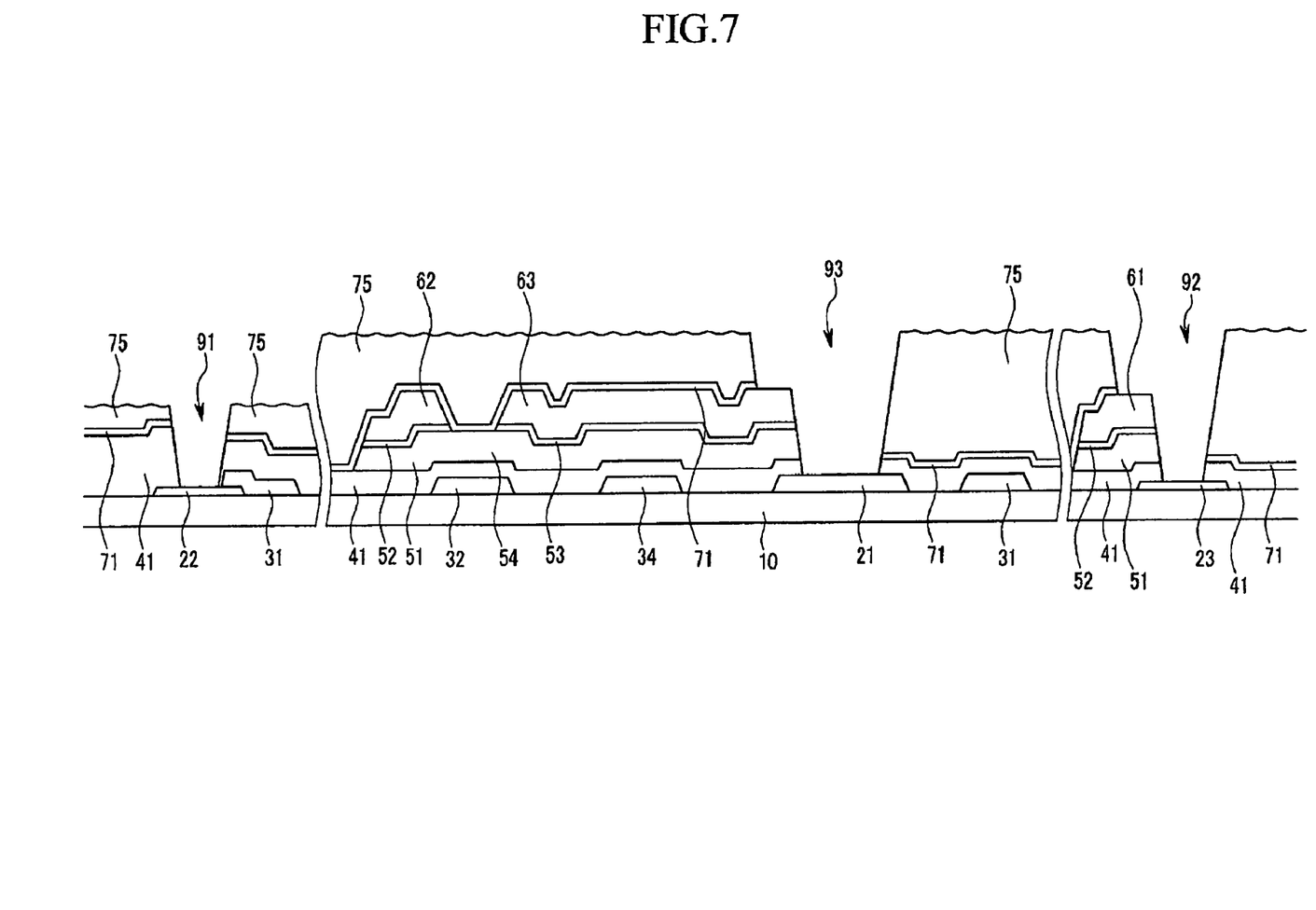

Referring to FIG. 7, the protective film 71 and the organic layer 75 are deposited. In an alternative embodiment, the protective film 71 may be omitted. By using a slit mask or a translucent mask, the organic layer 75 is patterned to form a plurality of contact holes 91 and 92 and a plurality of openings 93. Slits or a translucent layer of the mask is used to form uneven surface of the organic layer 75 or to reduce a height of the organic layer 75 near the pads 22 and 23.

Figure 8:
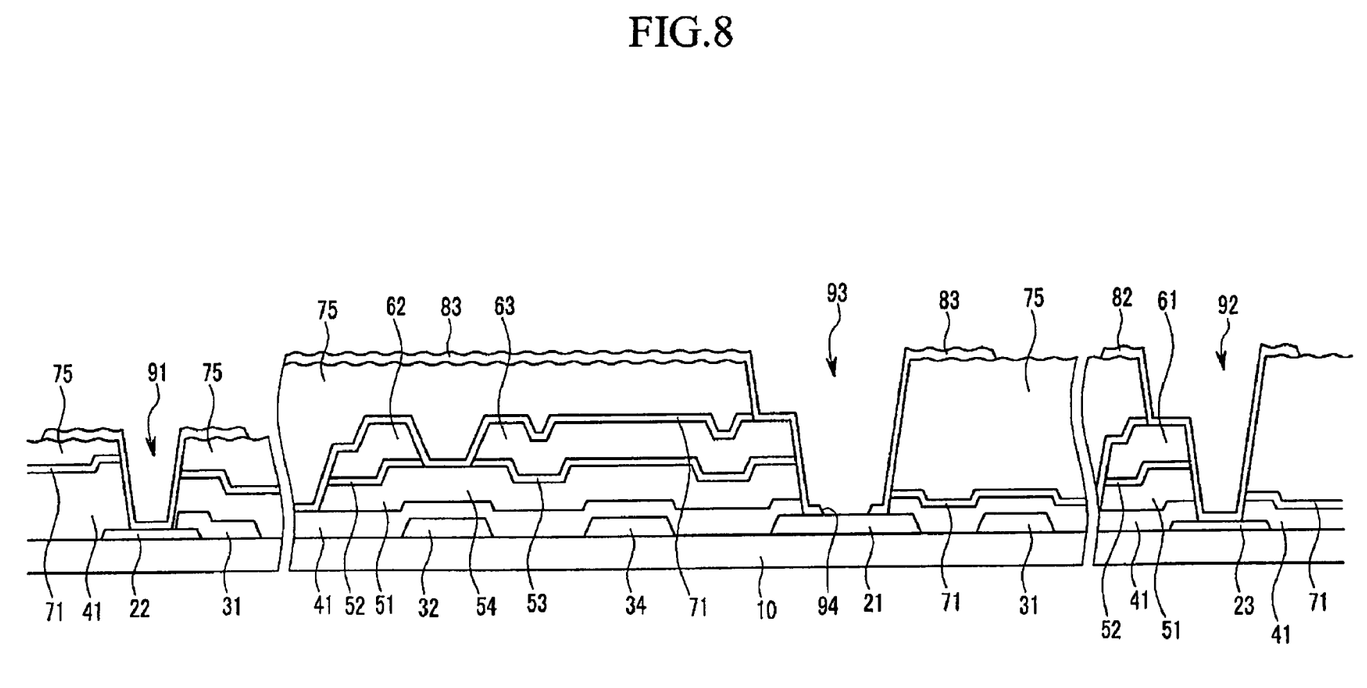

Referring to FIG. 8, the plurality of reflective electrodes 83 and the plurality of contact assistants 81 and 82 are formed on the organic layer 75. The reflective electrodes 83 are connected to the drain electrodes 63 and the transparent electrodes 21 through the openings 93. The contact assistants 81 are connected to the gate pads 22 through the contact holes 91. The contact assistants 82 are connected to the data lines 61 and the data pads 23 through the contact holes 92.

Figure 9:
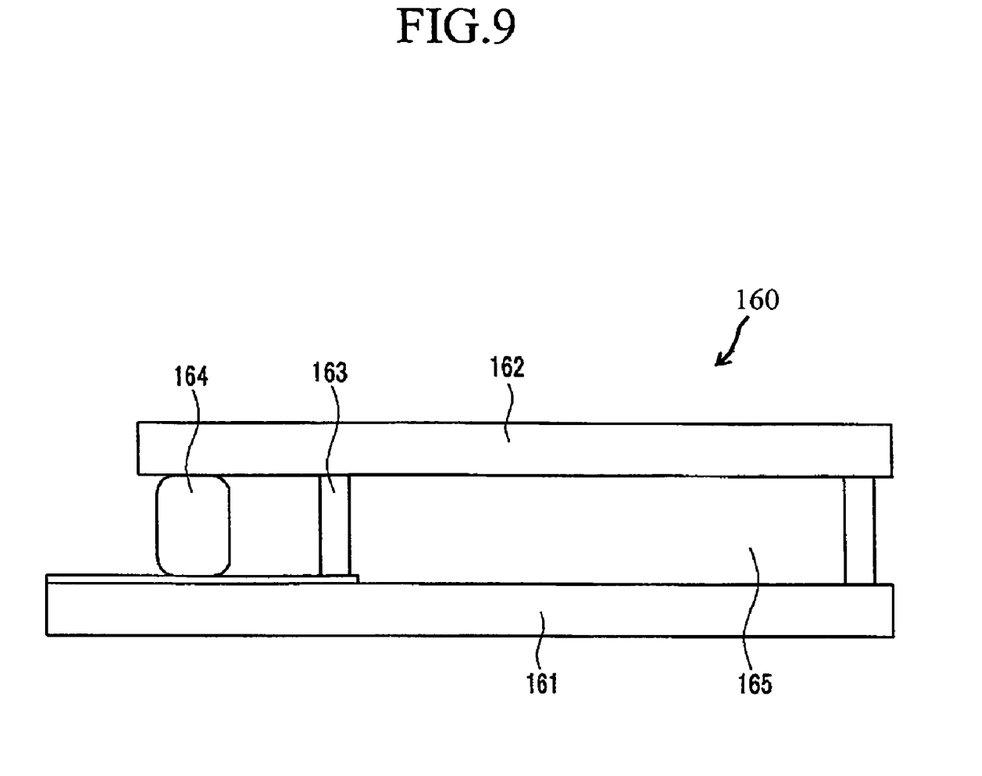
FIG. 9 is a cross-sectional view showing a panel assembly including a transistor array panel according to an embodiment of the present invention.

FIG. 9 shows a panel assembly 160 according to an embodiment of the present invention. The panel assembly includes the transistor array panel 161 shown in FIGS. 1 and 2.

A liquid crystal layer 165 is interposed between the transistor array panel 161 and a color filter panel 162. The liquid crystal layer 165 adjusts an amount of light to display an image. A panel assembly 160 is sealed with a sealant 163 to prevent leakage of liquid crystal molecules. An electrical signal is applied from an external driving circuit through a short-circuit member 164 to a transparent electrode 21. The short-circuit member 164 is located between the color filter panel 162 and the transistor array panel 161. Therefore, an electric potential difference is generated between the transparent electrode 21 and the reflective electrode 83 and the common electrode, so that alignment of the liquid crystal molecules in the liquid crystal layer 165 can be adjusted.

Figure 10:
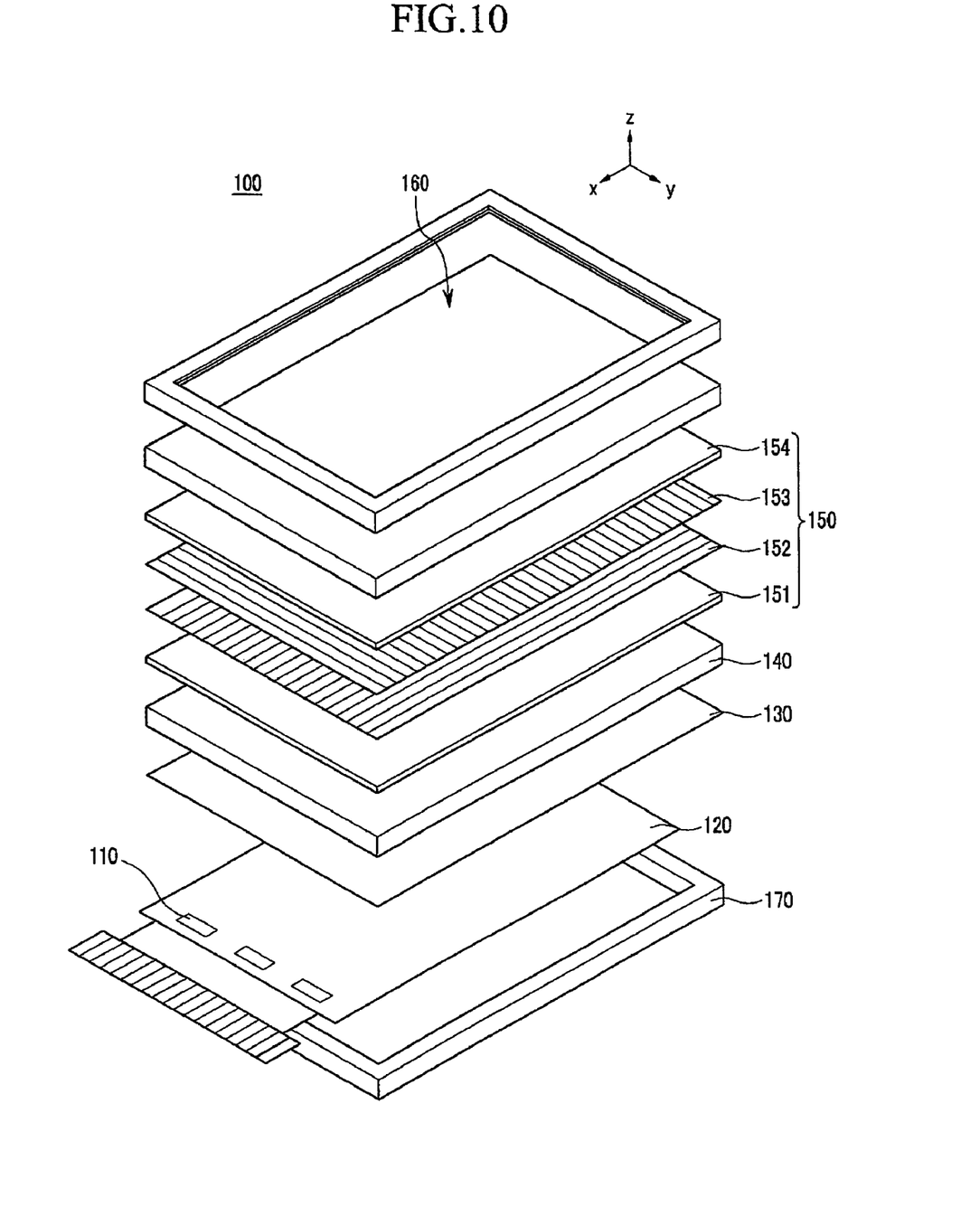
FIG. 10 is a perspective view showing an LCD employing a panel assembly according to an embodiment of the present invention.

FIG. 10 shows an LCD 100 including the panel assembly 160 shown in FIG. 9. The LCD 100 includes, for example, the panel assembly 160, a backlight light source unit 110, and a driving circuit unit 120 transmitting electrical signals supplied from external circuits to the light source unit 110 and the panel assembly 160.

The driving circuit unit 120 includes a flexible printed circuit film. The driving circuit unit 120 transmits the external electrical signals to the light source unit 110 and semiconductor chips of the panel assembly 160. Since the panel assembly 160 is a non-emissive device, to display an image, a light source for supplying light having a sufficient luminance to the panel assembly 160 is required.

In an embodiment, a light emitting diode (LED) having high luminance can be used as the light source unit 110. The light emitting diode can be used for a medium-sized or small-sized LCD used in a device such as, for example, a mobile phone. The light emitting diode can be mounted on the driving circuit unit 120.

A light emission path from the light source unit 110 on the driving circuit unit 120 changes from the transverse direction to the longitudinal direction of the panel assembly 160 by a light guiding plate 140 and a reflecting plate 130.

The reflecting plate 130 is disposed under the light guiding plate 140. The reflecting plate 130 reflects light from the light guiding plate 140 back to the light guiding plate 140, so that the transmitting efficiency of the light emitted from the light guiding plate 140 can be increased.

The light guiding plate 140 can be contained in a container 170. The light source unit 110 includes, for example, a point-type light source or a bar-type light source. The light guiding plate 140 converts incident light from the light source unit 110 into light as if it were emitted from a plate-like light source.

Optical sheets 150 include a diffuser sheet 151, a first prism sheet 152, a second prism sheet 153, and a reflective polarizing sheet 154. The diffuser sheet 151 diffuses the light emitted from the light guiding plate 140 over the entire area of the diffuser sheet 151. When the light diffused over the entire area of the diffuser sheet 151 is incident on the panel assembly 160, the light efficiency has the highest value if the incident light is normal to a surface of the panel assembly 160. According to an embodiment of the present invention, prism sheets 152 and 153 are laminated to guide the light passing through the diffuser sheet 151 in the perpendicular direction of the panel assembly 160.

The normally incident light from the light guiding plate 140 and the reflecting plate 130 can be converged by triangular prisms arrayed on the first and second prism sheets 152 and 153. The extending direction of the first prism arrayed on the first prism sheet 152 is perpendicular to the extending direction of the second prisms arrayed on the second prism sheet 153. The light focused by the prism sheets 152 and 153 emits through the reflective polarizing sheet 154 which may include, for example, a dual brightness enhancement film (DBEF).

The reflective polarizing sheet 154 prevents the light, having a limited optical characteristic among the light passing through the first and second prism sheets 152 and 153, from entering into the panel assembly 160, thereby preventing the decrease of the light efficiency. The reflective polarizing sheet 154 reflects incident light from the top surface of the panel assembly 160 and returns the reflected light to the panel assembly 160.

Figure 11:
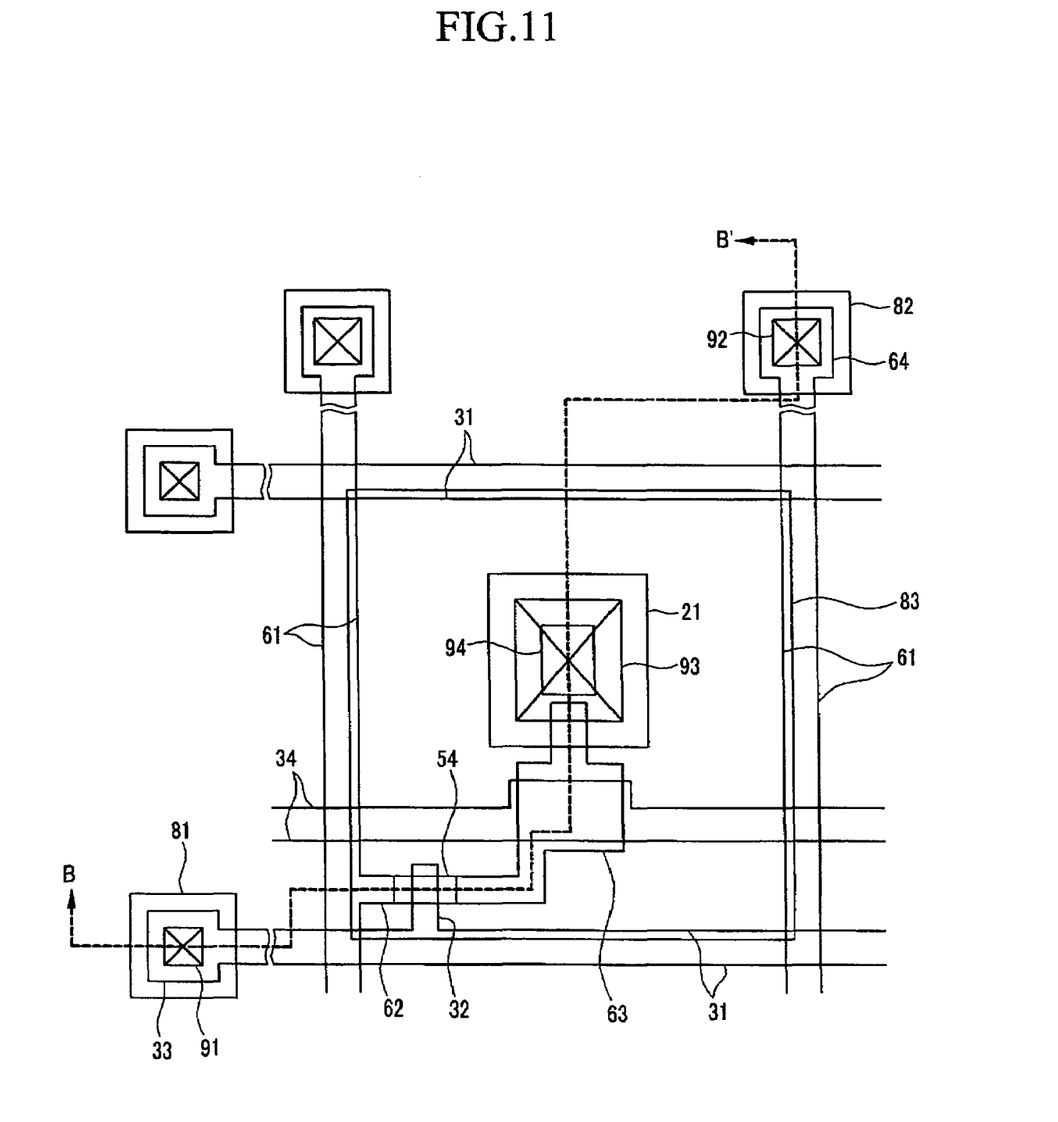
FIG. 11 is a layout view showing a transistor array panel according to another embodiment of the present invention.
Figure 12:
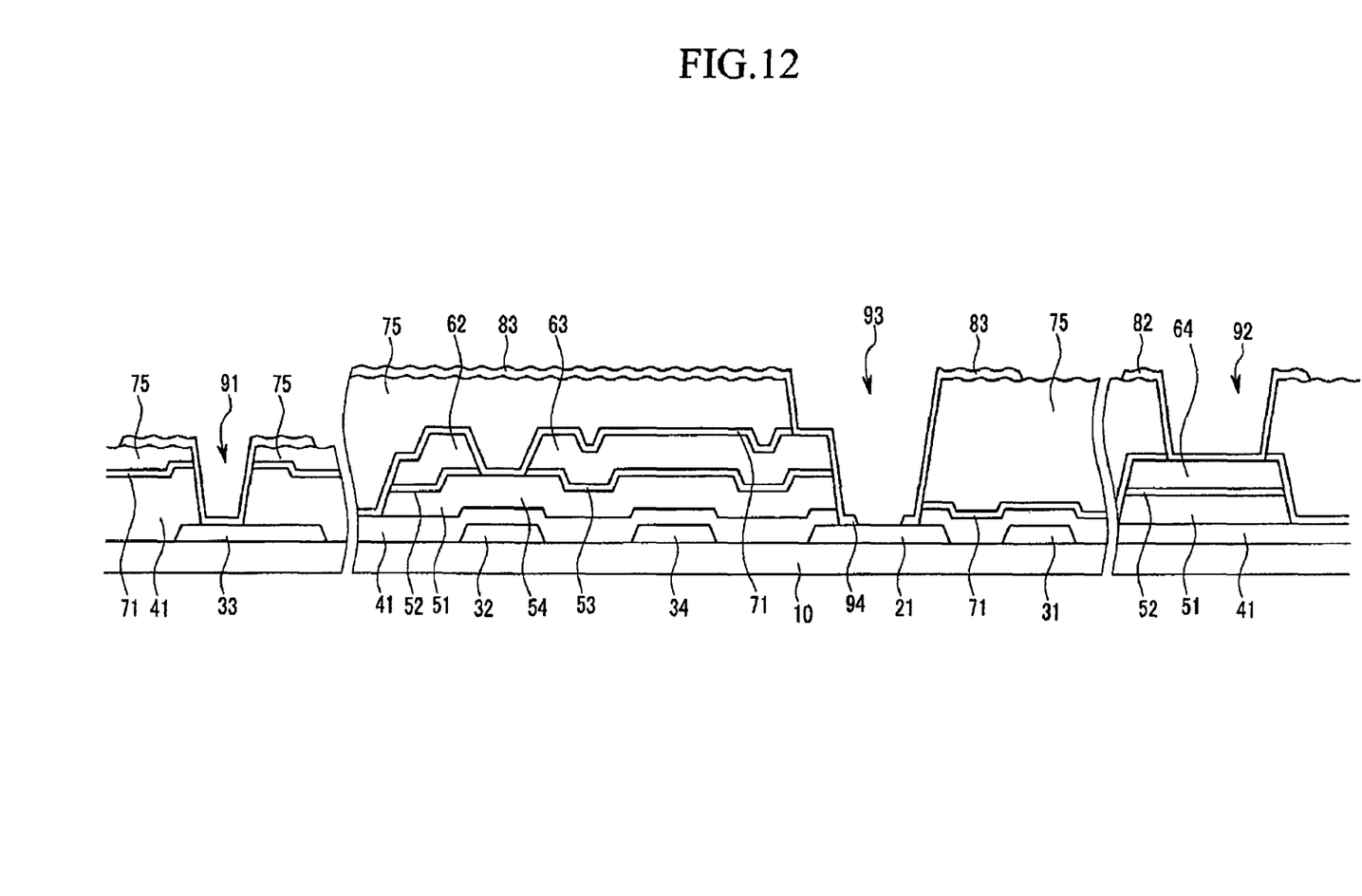
FIG. 12 is a cross-sectional view of the transistor array panel taken along the line B-B' of FIG. 11.

FIG. 11 is a layout view showing a transistor array panel for a transflective LCD according to another embodiment of the present invention. FIG. 12 is a cross-sectional view of the transistor array panel taken along the line B-B' of FIG. 11.

Five masks can be used for manufacturing the transistor array panel according to the embodiments described in connection with FIGS. 1 and 2, and FIGS. 11 and 12. A transparent electrode 21 is formed in a transmissive region of a pixel portion by using a first mask. A plurality of gate lines 31, including gate electrodes 32 and end portions 33, and a plurality of auxiliary capacitor electrode lines 34 are formed by patterning a gate conductive layer with a second mask. The gate conductive layer may comprise, for example, ITO or IZO.

Next, a gate insulating layer 41, a semiconductor layer comprising, for example, amorphous silicon, and an $n^+$ amorphous silicon layer are deposited. Then, a data metal layer is deposited. By using a third mask process, the data metal layer, the $n^+$ amorphous silicon layer, and the semiconductor layer are patterned to form a plurality of data lines 61 including source electrodes 62 and end portions 64, a plurality of drain electrodes 63, a plurality of ohmic contacts 52 and 53, and a plurality of semiconductor stripes 51. As previously described in connection with FIG. 6, this step may be performed by using a slit mask or a transflective mask.

Next, a protective film 71 and an organic layer 75 are deposited on the data lines 61 and the drain electrodes 63. Then, a fourth mask process using, for example, the slit mask or the translucent mask is performed to form a plurality of contact holes 91 exposing the end portions 33 of the gate lines 31, a plurality of contact holes 92 exposing the end portions 64 of the data lines 61, a plurality of openings 93 exposing the drain electrodes 63 and the transparent electrodes 21. At this time, an uneven surface of the organic layer 75 is formed. In an embodiment, the protective film 71 may be omitted.

Next, a reflective metal layer is deposited on the organic layer 75, and a fifth mask process is performed on the reflective metal layer to form a plurality of reflective electrodes 83 and a plurality of contact assistants 81 and 82. In an embodiment, each of the reflective electrodes 83 contacts a drain electrode 63 and a transparent electrode 21, and the contact assistants 81 and 82 contact the end portions 33 of the gate lines 31 and the end portions of 64 of the data lines 61.

In a transistor array panel according to an embodiment the present invention, a smooth step difference is provided between a reflective electrode of a pixel-portion reflecting region and a transparent electrode of a pixel-portion transmissive region. The reflective electrode of a pixel-portion is formed on an organic layer and the transparent electrode of a pixel-portion transmissive region is formed on a substrate. As a result, implementation of a dual cell gap structure is facilitated.

In a method of manufacturing a transistor array panel according to an embodiment of the present invention, fewer masks are used compared to a conventional method.

Although the exemplary embodiments of the present invention have been described with reference to the accompanying drawings, it is to be understood that the present invention should not be limited to these precise embodiments but various changes and modifications can be made by one ordinary skill in the art without departing from the spirit and scope of the present invention. All such changes and modifications are intended to be included with the scope of the invention as defined by the appended claims.

What is claimed is:

1. A transistor array panel comprising:
   a substrate;
   a transparent electrode disposed on the substrate;
   a gate line disposed on the substrate;
   a gate insulating layer disposed on the transparent electrode and the gate line;
   a semiconductor layer disposed on the gate insulating layer;
   a data line and a drain electrode disposed on the semiconductor layer;
   a first insulating layer having an uneven surface, wherein the first insulating layer is disposed on the data line and the drain electrode; and
   a reflective electrode disposed on the first insulating layer, wherein the reflective electrode is connected to the transparent electrode and the drain electrode, and at least a portion of the transparent electrode is exposed.

2. The transistor array panel of claim 1, wherein the portion of the transparent electrode is exposed through a transmitting window in the reflective electrode.

3. The transistor array panel of claim 1, further comprising a second insulating layer disposed between the first insulating layer and the data line.

4. The transistor array panel of claim 3, wherein the first insulating layer comprises an organic layer, and the second insulating layer comprises an inorganic layer.

5. The transistor array panel of claim 4, wherein the first insulating layer comprises a photosensitive film.

6. The transistor array panel of claim 1, wherein the first insulating layer has an opening exposing both the transparent electrode and the drain electrode, and wherein the reflective electrode contacts the transparent electrode and the drain electrode through the opening.

7. The transistor array panel of claim 1, further comprising an auxiliary capacitor electrode formed on the substrate, wherein the auxiliary capacitor electrode is separated from the gate electrode, and overlaps the drain electrode.

8. The transistor array panel of claim 1, further comprising a gate pad disposed on the substrate, wherein the gate pad is formed from the same layer as the transparent electrode, and contacts the gate line.

9. The transistor array panel of claim 8, further comprising a contact assistant disposed on the first insulating layer,
wherein the first insulating layer and the gate insulating layer have a contact hole exposing the gate pad, and the contact assistant is connected to the gate pad through the contact hole.

10. The transistor array panel of claim 1, further comprising a data pad disposed on the substrate, wherein the data pad is formed from the same layer as the transparent electrode, and contacts the data line.

11. The transistor array panel of claim 10, further comprising a contact assistant disposed on the first insulating layer,
wherein the first insulating layer and the gate insulating layer have a contact hole exposing both the data pad and the data line, and wherein the contact assistant is connected to the data line and the data pad through the contact hole.

12. The transistor array panel of claim 1, further comprising a contact assistant disposed on the first insulating layer,
wherein the first insulating layer and the gate insulating layer have a contact hole exposing a portion of the gate line, and the contact assistant is connected to the gate line through the contact hole.

13. The transistor array panel of claim 1, further comprising a contact assistant disposed on the first insulating layer,
wherein the first insulating layer have a contact hole exposing a portion of the data line, and the contact assistant is connected to the data line though the contact hole.

14. A liquid crystal display comprising:
a transistor array panel comprising:
a substrate;
a transparent electrode disposed on the substrate;
a gate line and a data line disposed on the substrate;
a thin film transistor connected to the gate line and the data line;
a first insulating layer having an uneven surface and disposed on the gate line, the data line, and the thin film transistor; and
a reflective electrode disposed on the first insulating layer, wherein the reflective electrode is connected to the transparent electrode and the thin film transistor, and the reflective electrode includes a transmitting window exposing at least a portion of the transparent electrode;
a light source providing light to the transistor array panel; and
a driving circuit unit supplying an electrical signal to the transistor array panel.

* * * * *